Figure 1:
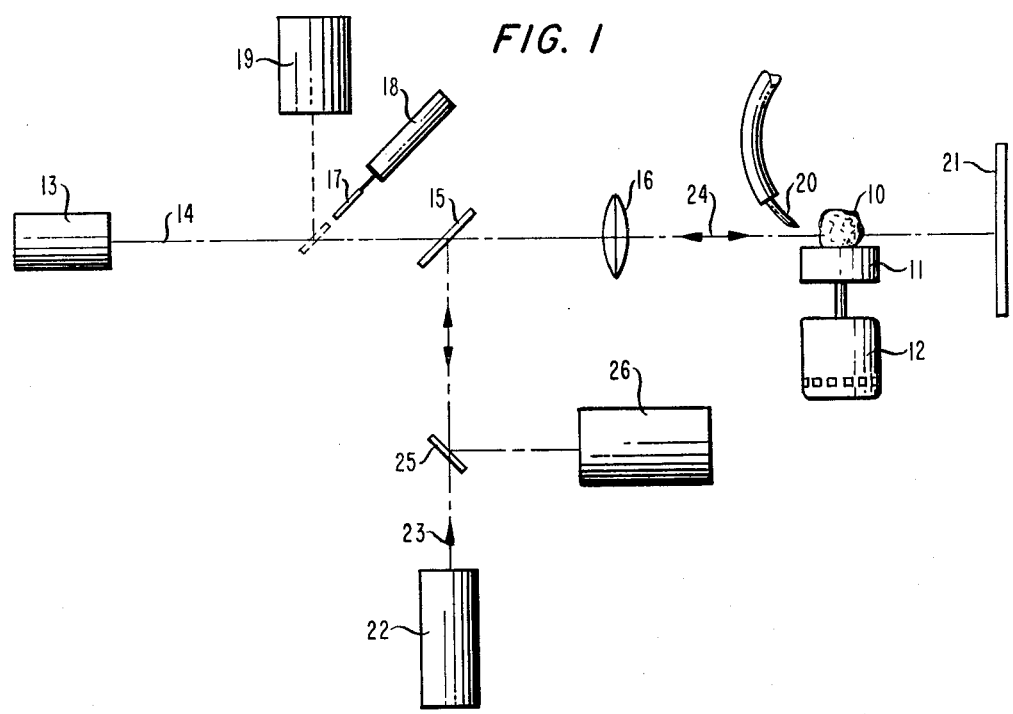

United States Patent [19]

Patel

[11] 4,358,467
[45] Nov. 9, 1982

[54] METHOD FOR SHELLING OF NUTS WITH A LASER BEAM

[76] Inventor: Chandra K. N. Patel, 5 Manor Hill Rd., Summit, N.J. 07901

[21] Appl. No.: 195,374

[22] Filed: Oct. 9, 1980

[51] Int. Cl.³ ............................................. A23L 1/212
[52] U.S. Cl. ..................................... 426/237; 99/451; 99/568; 219/121 FS; 219/121 L; 219/121 LM; 219/121 LS; 219/121 LZ; 426/482
[58] Field of Search ............... 426/237, 238, 240, 241, 426/242, 248, 482; 99/451, 568, 582, 574, 575, 576; 219/121 LB, 121 LQ, 121 LS, 121 LZ, 121 FS, 121 L, 121 LM

[56] References Cited

U.S. PATENT DOCUMENTS

| | | | |
|---|---|---|---|
| 2,431,602 | 11/1947 | Zeun ................................. | 99/576 X |
| 2,601,421 | 6/1952 | Thaning . | |
| 2,661,784 | 12/1953 | McMillan . | |
| 2,747,635 | 5/1956 | Kofoid . | |
| 2,755,834 | 7/1956 | Mulvany . | |
| 2,762,410 | 9/1956 | Stahl ................................. | 99/568 X |
| 2,995,166 | 8/1961 | Burley et al. ...................... | 426/241 |
| 3,009,561 | 11/1961 | Schoolcraft et al. . | |
| 3,524,038 | 8/1970 | O'Kelly ..................... | 219/121 FS X |
| 3,710,798 | 1/1973 | Bredemeier ................. | 219/121 L X |
| 3,817,703 | 6/1974 | Atwood ........................... | 426/248 X |
| 3,839,005 | 10/1974 | Meyer ......................... | 219/121 FS X |
| 4,289,378 | 9/1981 | Remy et al. ............... | 219/121 LS X |

FOREIGN PATENT DOCUMENTS 488469  4/1976  Australia ................................ 99/576

OTHER PUBLICATIONS

*Time Magazine*, 7-12-68, p. 49.

*Primary Examiner*—Arthur L. Corbin

[57] ABSTRACT

The removal of shells from hard shelled nuts, particularly macadamia nuts, is accomplished by rotating the nut in the path of a high power cw laser beam, such as a $CO_2$ laser beam, so as to burn a path around the shell which separates the shell into parts which can readily be removed from the nut. A low power laser beam of a wavelength for which the nut shell and underlying nut meat have substantially different reflectivities, such as a helium-neon laser beam, is arranged to strike the nut collinearly with the high power beam. When the nut meat is exposed as the path in the shell is burned away, the intensity of the low power beam light which is reflected by the nut increases, and this increase is detected to give an indication of the completion of the shell burning operation.

10 Claims, 2 Drawing Figures

METHOD FOR SHELLING OF NUTS WITH A LASER BEAM

This invention relates to methods and apparatus for removing hard shells from nuts.

Various techniques have been proposed for the removal of hard shells from nuts, including mechanical cracking, cutting or abrading, electrical shattering and the bursting of the shells by generation of internal pressure. These techniques suffer from the disadvantage that they are laborious, or they have a tendency to break or otherwise injure the nut meat in the process of shell removal.

In the commercial shelling of macadamia nuts, for instance, the shells which are particularly hard and of varied thickness are ordinarily removed by mechanically cutting or abrading a circumferential path around the shell to a depth sufficient to penetrate the shell but not to injure the nut meat and the two shell hemispheres thus generated are separated from the nut meat. This operation is a costly one which is a contributing factor to the high cost of shelled macadamia nuts.

It has been found according to the present invention that macadamia nuts, and thus other nuts presenting similar shelling problems, can be readily shelled without injury to the nut meat by directing a high power cw laser beam at the shell, with which it intersects at a point of contact and which is vaporized locally at this point of contact by the energy of the laser beam. By causing relative movement between this point of contact and the shell, a closed path of vaporization can be defined which delineates the shell into segments which can be separated. This is done most effectively with essentially spheroidal nuts by causing the point of contact to traverse a closed path about the shell which separates the shell into approximately two hemispheres.

Thus an essentially spheroidal nut, such as a macadamia nut, can be rotated in the path of the laser beam until the shell has been burned through to create an essentially equatorial path about the nut which divides it into two hemispheres. The laser beam is applied so as to burn essentially completely through the shell but its action upon the nut is ordinarily interrupted before any significant attack upon the underlying nut meat occurs.

Determination of the point at which a path has been burned completely through the shell, exposing the underlying nut meat, is accomplished in accordance with the present invention by directing at the path of disintegration about the nut a second laser beam of a wavelength different from the high power laser beam and of a power insufficient to cause significant disintegration of the nut shell. The wavelength of the second laser beam is one, ordinarily within the visible range, for which the reflectivity of the exposed nut meat is significantly different from that of the shell. Thus the point in time at which the shell has been completely burned away along the disintegration path can be determined by measuring the change in intensity of the light of the wavelength of the second laser beam reflected from the nut as the burning away of the shell on successive rotations exposes the underlying nut meat.

This monitoring of the disintegration of the shell is preferably accomplished by having the second laser beam approach the shell along a path which is collinear with the high power laser beam. The reflection of the second laser beam light will then occur from the same spot on the shell as is being rendered incandescent and is being vaporized by the energy of the high power laser beam. This reflected light can be gathered and its intensity measured in any known manner. The application of the high power laser beam to the nut can be automatically interrupted as soon as the change in intensity indicates that the light is being reflected from the underlying nut meat rather than the shell.

Having the second laser beam approach the shell along a path collinear with the high power laser beam can provide an additional advantage in that during the period in which the application of the high power beam to the nut is interrupted the second laser beam, which constitutes little hazard, can be allowed to continue to follow its path to the nut treating area and thus give a visual indication of where the high power beam will strike the nut when next applied. The alignment of the nut and laser beam is thus capable of being monitored without the hazard of applying the high power beam.

Along with the irradiation of the nut with the focussed beam of high power laser radiation, a jet of air (or nitrogen or an inert gas such as argon) is directed at the point of contact of high power laser beam and the nut, tangential to the nut and along the plane formed by the axis of the high power laser beam and the closed path about the nut. The jet of air blows the smoke and the evaporation debris away from the path of the laser beam and thus minimizes the attenuation of the high power laser beam by the smoke and attenuation and scattering of the high power laser beam by the evaporation debris. In this manner, it is possible to obtain deep but very narrow cuts necessary in the hard shells of the nuts (deep enough for the separation of the two halves of the shell). Such an incision is then of the width determined primarily by the focussed diameter of the high power laser beam, and no additional scattering of the high power laser light occurs by the evaporation debris. Such scattering would lead to wider kerf requiring increased average cutting time for the shells.

More efficient use of the laser beam source can be achieved by providing a plurality of locations at which nuts are rotatably mounted for subjection to the action of the laser beam and by directing the beam successively to each location after the burning of the path around the nut shell has been completed in the preceding location. Each treated nut can be removed and replaced by a new nut after the laser beam is diverted from the location in which it is mounted.

Figure 2:
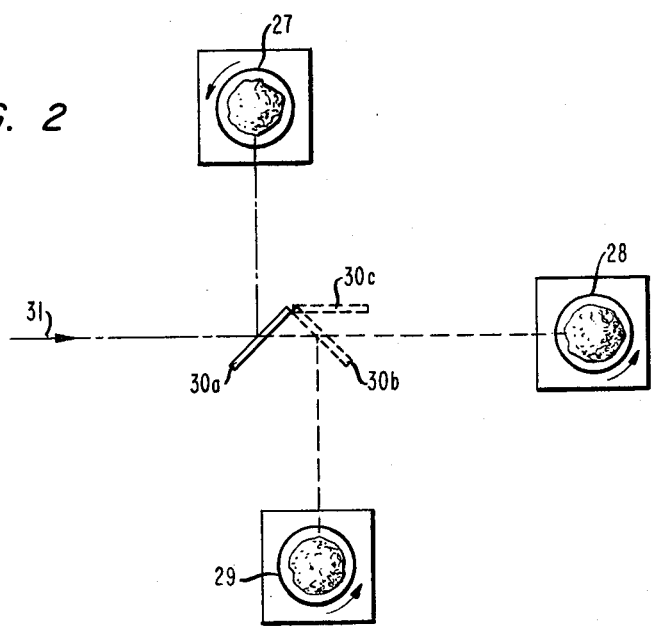

In the accompanying drawing:

FIG. 1 is a diagrammatic side view representation of one form of apparatus arrangement for burning a path about the shell of a nut by means of a laser beam according to the present invention; and FIG. 2 is a diagrammatic plan view representation of one form of means according to the present invention for directing a laser beam successively at a plurality of locations at which nuts are mounted.

In FIG. 1, a nut 10 is mounted in a holder 11 rotated by a motor 12. A $CO_2$ laser 13 generates a beam 14 which, after passing through dichroic beam combiner 15, is focussed by lens 16 upon the surface of the shell of nut 10. A front surface mirror 17 is actuated by solenoid 18 to be inserted in the path of beam 14, except when a nut is being processed, so as to divert the beam into a suitable absorbing device 19 which may be a power meter for monitoring the power level of the beam. During the treatment of a nut, the mirror 17 is retracted by solenoid 18 so as to permit beam 14 to proceed to the location occupied by the nut. A nozzle 20 is connected to a source of air or other non-combustible or inert gas and is arranged to direct a jet of gas at the region where the laser beam contacts the nut shell so as to disperse smoke and evaporation debris generated by the action of the beam on the shell, which smoke and debris would tend to attenuate and scatter the beam if undispersed. A beam stop 21 is provided behind the nut mounting position to restrict the action of the beam to within the nut treating area.

A helium-neon laser 22 generates a beam 23 which is directed at dichroic beam combiner 15, which is transparent to the 10.6 micrometer beam from the $CO_2$ laser but is highly reflective of the 6328 A beam from the helium-neon laser, so as to be reflected toward the nut 10 along a path 24 which is collinear with the beam 14 from the $CO_2$ laser. A beam splitter 25 is located in the helium-neon beam path 23 between the helium-neon laser and the beam combiner 15. Helium-neon light reflected from the nut 10 returns through lens 16, is reflected by beam combiner 15 and by beam splitter 25 into detector 26 which is sensitive to the intensity of light of the helium-neon wavelength. As soon as this detector registers an intensity of helium-neon light indicating reflection from the lighter colored underlying nut meat, as contrasted with the lesser intensity from the darker shell, the solenoid 18 is actuated to interpose the mirror 17 between $CO_2$ laser 13 and the nut so as to stop the action of the $CO_2$ beam upon the nut. The treated nut is then removed and replaced by another nut, the solenoid 18 is caused to retract the mirror 17, allowing the beam 14 to contact the rotating nut and the cycle is repeated.

In FIG. 2, a plurality of rotatable nut mounting means 27, 28, 29 are provided. A mirror 30 is constructed and positioned so that it can be rotated between positions 30a, 30b and 30c. When the mirror is in position 30a as shown, the laser beam or beams 31 which can be similar in constitution to laser path 24 of FIG. 1, is reflected so as to contact the rotating nut mounted in mounting means 27. As soon as the disintegration of a path around the shell of the rotating nut is completed, exposing the underlying nut meat, the mirror is rotated to position 30b, causing the beam 31 to be reflected so as to contact the rotating nut mounted in mounting means 29. When the treatment of the nut in this location is completed, the mirror is rotated to position 30c permitting the beam 31 to pass unobstructed into contact with the rotating nut in mounting means 28. When the treatment of the nut in this location is completed, the mirror is rotated to position 30a and the cycle is repeated. The treated nuts in each location are replaced by new nuts during the period in which the beam is directed to the other locations. A larger number of nut mounting locations than the three shown in FIG. 2 can be used.

Each operation described with respect to the apparatus in both FIG. 1 and FIG. 2 can be carried out manually, but the procedure is well adapted to automated operation using control techniques and nut holding, feeding and withdrawing procedures known in the art.

It was found that the shells of macadamia nuts rotated at one revolution per second had a path burned through after 5 revolutions, or in a time of 5 seconds, when a $CO_2$ laser was used having a power output of 60 watts. This time can be reduced to about 1 second by using a laser with a 300 watt output or to about 0.5 second with a 600 watt laser. Faster rotations will be used with the higher power lasers so that the entire circumference of the shell can be burned away without causing residence of the beam at any point on the shell substantially longer than is required to destroy the shell at that point.

The laser used for detection of the completion of nut treatment or for indication of beam path can conveniently by any laser with an output in the visible range, particularly the helium-neon laser indicated above.

I claim:

1. The method of removing a shell from a hard shell nut comprising directing at a region on the surface of the shell a first laser beam of sufficient power to cause disintegration of the shell at the point of contact of the laser beam, causing relative motion between the shell and said point of contact so as to establish a closed path of disintegration around the shell, thus dividing the shell into at least two segments in such manner as to enable the shell to be parted away from the nut meat, directing, at a point on said path around the shell, a second laser beam, of a wavelength at which the shell and the meat of said nut have a significantly different reflectivity and of a power insufficient to cause significant disintegration of said shell, detecting the intensity of light of said wavelength reflected from said point during said disintegration by said first laser beam, and discontinuing the application of said first laser beam to said shell when the change in said intensity of reflected light thus detected indicates that the nut meat at said point has become exposed by the disintegration of said shell.

2. The method of claim 1 wherein the nut shell is spheroidal and said closed path is established about an approximately equatorial circumference of the shell.

3. The method of claim 2 wherein the path of the laser beam at the point of contact with the shell is relatively fixed and the relative motion between the shell and the laser beam is established by rotation of the nut about an axis approximately normal to the plane of said equatorial circumference.

4. The method of claim 1 or claim 3 wherein the laser beam is repetitively directed successively at each of a plurality of nuts, each at a different location, and, when the disintegration of the closed path around the shell of each nut is completed, the application of the laser beam to that nut is discontinued and that nut is removed from its location and replaced by a new nut to be processed.

5. The method of claim 2 wherein the nut is a macadamia nut.

6. The method of claim 2 wherein the said first laser beam is diverted from the region occupied by said nut except during the operation of disintegration of said path on said shell, and the second laser beam is arranged to be collinear with the path of said first laser beam when undiverted and to provide visual indication of the point of laser contact with the shell while said first laser beam is so diverted.

7. The method of claim 1 wherein said second laser beam is directed at the same point on the shell as said first laser beam.

8. The method of claim 7 wherein the first laser beam is $CO_2$ laser beam and the second laser beam is a helium-neon laser beam.

9. The method of claim 7 wherein said second laser beam is collinear with said first laser beam in the region prior to the contact of said beams with said shell.

10. The method of claim 1 or claim 7 wherein the smoke and the vaporization debris resulting from disintegration of the shell are blown from the path of the laser beam by a moving body of a gas.

* * * * *